April 8, 1924.                    1,489,705

P. G. LEONARD

PIPE GRIPPING DEVICE

Filed Dec. 30, 1922        3 Sheets-Sheet 1

Witnesses:

Inventor:
Peter G. Leonard
By Joshua R. H. Potts.
His Attorney

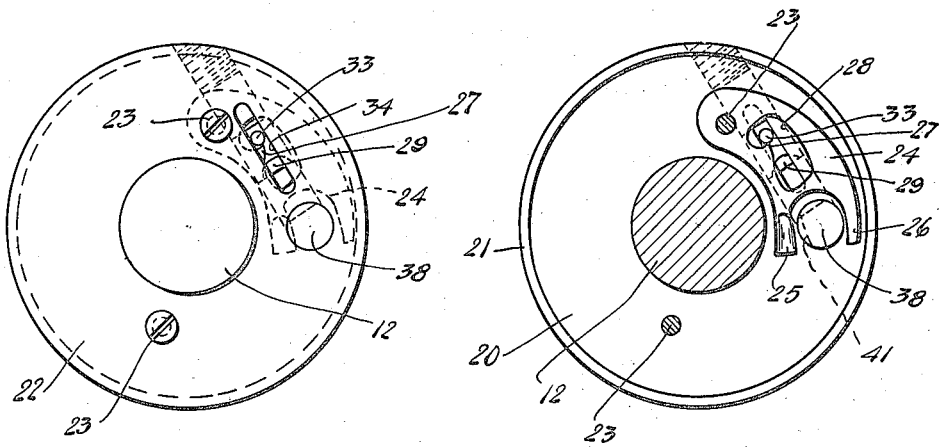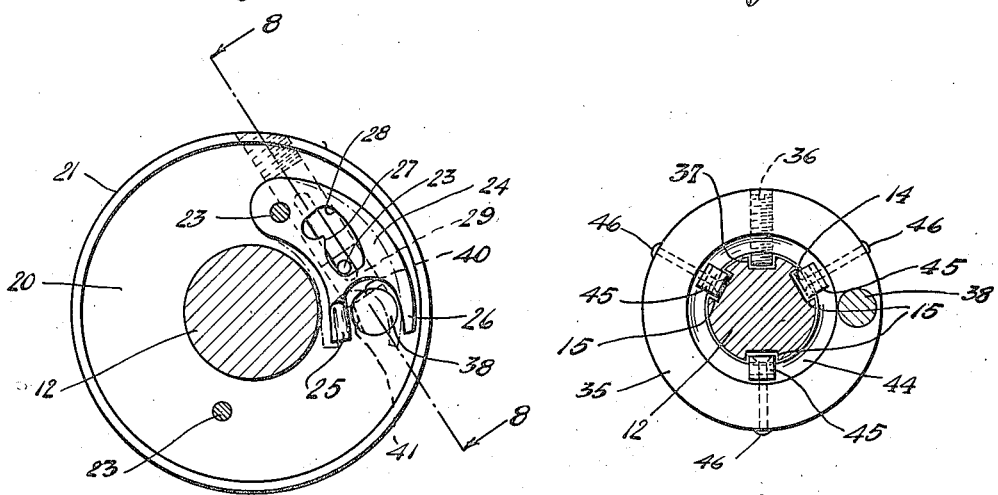

April 8, 1924.

P. G. LEONARD

PIPE GRIPPING DEVICE

Filed Dec. 30, 1922

Witnesses:

Inventor:
Peter G. Leonard
By Joshua R. H. Potts,
His Attorney

Patented Apr. 8, 1924.

1,489,705

UNITED STATES PATENT OFFICE.

PETER G. LEONARD, OF WEST TULSA, OKLAHOMA.

PIPE-GRIPPING DEVICE.

Application filed December 30, 1922. Serial No. 610,073.

*To all whom it may concern:*

Be it known that I, PETER G. LEONARD, a subject of the King of Sweden, and a resident of the city of West Tulsa, county of Tulsa, and State of Oklahoma, have invented certain new and useful Improvements in Pipe-Gripping Devices, of which the following is a specification.

My invention relates to improvements in pipe gripping devices, and the chief objects of the invention are to provide a strong body or shaft, preferably round in cross-section, having effective, curved gripping members mounted thereon for movement into and out of operative position; and to provide means which will 1st, lock said gripping members in release position for insertion in a pipe, 2nd, will automatically release said locking means and render said gripping members effective, 3rd, will again automatically lock said members in release position for removal from the pipe.

Other objects are to provide a strong and durable gripping device which is entirely effective and reliable in operation, is convenient to manipulate, and at the same time inexpensive to manufacture.

Other objects will appear hereinafter.

The invention consists in the combinations and arrangements of parts hereinafter described and claimed.

The invention will be best understood by reference to the accompanying drawings forming a part of this specification, and in which, Fig. 1, is an elevational view of the pipe gripping device with the gripping members locked in release position;

Fig. 3, is a top view of the device with members arranged as shown in Fig. 1;

Fig. 4, is a horizontal sectional view taken beneath the top plate, showing the locking plate released from the movable locking stem;

Fig. 5, is a horizontal sectional view taken on line 5—5 of Fig. 8;

Fig. 6, is a horizontal sectional view on line 6—6 of Fig. 1;

Figure 1:
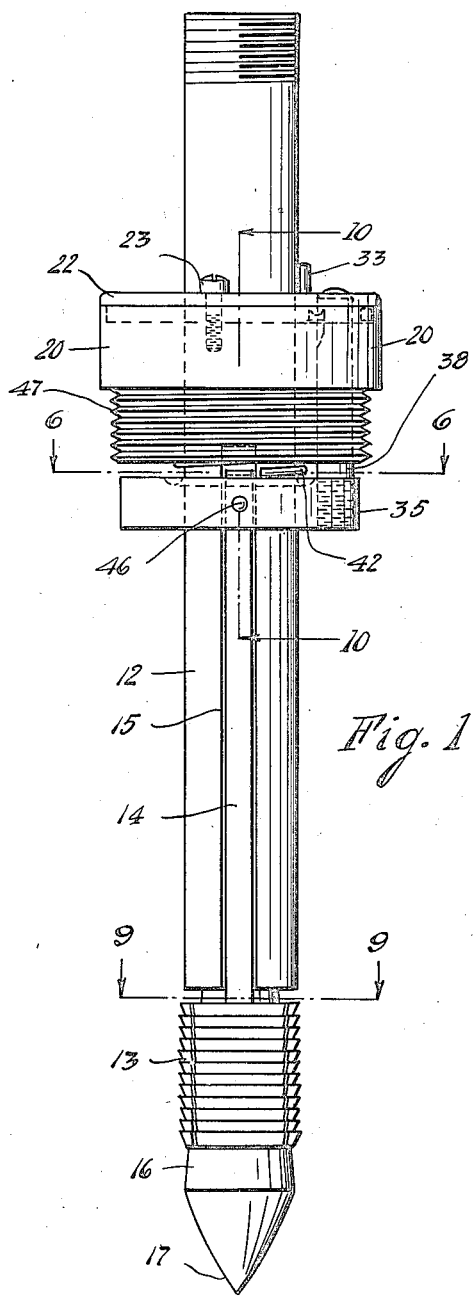
Figure 10:
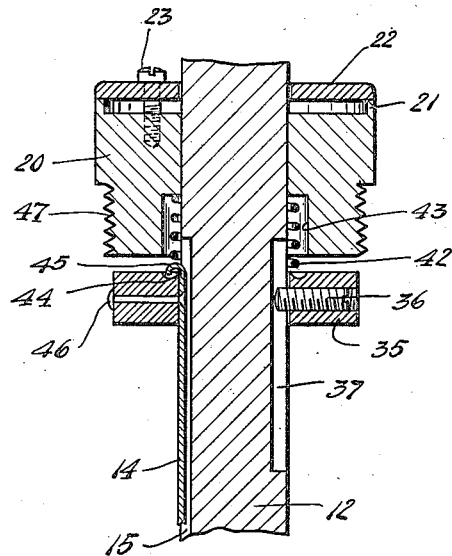
Figure 9:
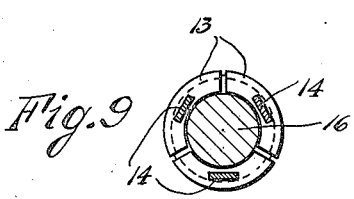

Figs. 9 and 10 are respectively horizontal and vertical sectional views taken on lines 9—9 and 10—10 of Fig. 1.

The form of my invention as illustrated comprises a body or shaft 12 preferably round in cross-section, and a plurality of curved or cylindrically-shaped gripping members 13 provided each with pipe-engaging serrations and with a tang or shank 14 slidable in a groove 15 on the body 12. At its upper end the body is provided with a thread to attach it to a suitable tool or pipe for lowering it into and hoisting it out of a well, and at its lower end with a spear or expanding portion 16 which is restricted adjacent the body and increases in diameter towards its lower or spear end 17. Said spear is movable on the gripping members and in view of its conical shape forces them into firm biting engagement with the surrounding pipe.

Heretofore pipe gripping or pipe pulling devices of this type, for gripping the pipe internally, have not (to my knowledge) been provided with automatic means for releasing the gripping members after said members are set or expanded in the pipe, because too much metal had to be cut from the body of the device to provide room for housing said releasing means, thereby greatly weakening the device.

I provide mechanism for fully accomplishing the above purpose without materially weakening the body of the gripping device. Such mechanism comprises a collar 20 fixed on the body or shaft 12 in any suitable manner, as by welding or sweating it thereon. The upper end of said collar is provided with a circular flange 21 and a plate 22 fastened thereon with screws 23, thereby forming a space or chamber in which a locking plate 24 is housed and swingably mounted on one of said screws 23. Said plate is provided with a locking finger 25, a bearing finger 26 and a pointed holding lug 27 projecting into a slot 28 formed in said plate.

I provide means in the form of a plunger or pawl 29 for actuating said locking plate, said plunger being slidably mounted in a bore 30 in said collar, and this plunger is urged inward by means of a spring 31 seated on the plunger stem and operating against a sleeve 32 threaded in the end of said bore. A pin 33 extends upward from the plunger through slot 28 and through a slot 34 in the closing plate 22. This pin is engageable by the hand for moving and setting the plunger and is placed behind the pointed lug 27 to retain the plunger in release position and to swing said plate inward toward the body 12, also in release position.

Figure 2:
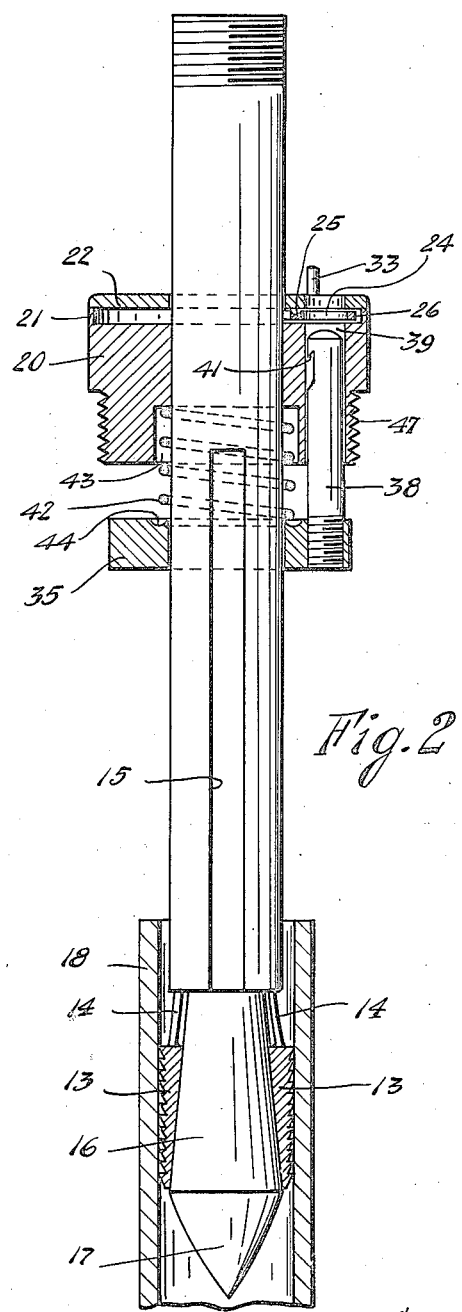
Fig. 2, is a vertical sectional view of the device with the gripping members in active, pipe-engaging position.

A collar 35 is slidably mounted on the body 12, beneath said fixed collar 20 and carries a screw 36 engaging freely in a vertical groove 37 on said body for directing and limiting the movements of said collar. A stem 38 extends upward from said movable collar, engaging in a bore 39 in the fixed collar, and is provided with a notch forming a lip 40 for engaging the pointed end of plunger 29 (see Figs. 5 and 8) and with an adjoining notch forming a lip 41 for engaging the locking finger 25 on the locking plate 24, as best seen in Figs. 2 and 3. A spring 42 engages in a seat 43 in collar 20 and in a groove 44 in collar 35 to urge said collars apart, and the shanks 14 of the gripping members have hook ends 45 which also engage in said groove 44, said shanks being fastened on said collar 35 with pins 46 or in any suitable manner. Threads 47 are formed on collar 20 for attaching a sleeve to cover the lower members, if desired.

To set the device in operative position the plunger 29 is drawn back by means of the pin 33 which engages the rear of slot 28 in the locking plate and swings the locking plate outward on its pivot 23, and upon releasing the pin 33 said pin engages behind the holding lug, thereafter the collar 35 with its stem 38 is moved upwards until its lip 41 is engaged by the finger 25 of the locking plate to hold the collar 35 and the attached gripping members 13 in elevated or release position. The spring 42 exerts sufficient pressure between the collars to retain the locking finger 25 in locking position under the lip 41 of stem 38, while the pin 33 on plunger 29 is seated behind the holding lug 27 of the locking plate, the members being in the positions shown in Figs. 1 and 3, ready for insertion in a pipe which is to be drawn from the well.

Figure 8:
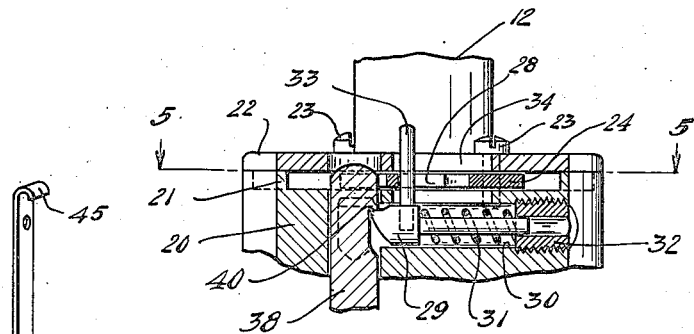
Fig. 8 is a vertical sectional view taken on line 8—8 of Fig. 5.
Figure 7:
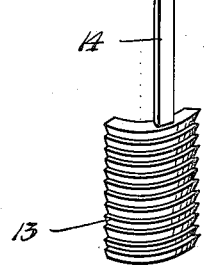
Fig. 7, is a view of a pipe gripping member with its attached shank or tang.

In using my gripping device the gripping members are first positively fastened or locked in release position on the restricted part of spear 16, as shown in Figs. 1 and 3, and with the lower part of the shaft are then inserted into the pipe, and the device is thrust downward until the collar 35 engages the end of the pipe forcing said collar slightly upwards, whereby the lip 41 on the locking stem is slightly elevated from the locking finger 25, permitting the spring 31 on plunger 29 to force the pin 33 forward and carry with it the lug 27 thereby swinging the locking plate inward towards the shaft 12 releasing the the locking finger 25, into the position shown in Fig. 4. This action has released the locking means which hold the gripping members in release position, and upon drawing the shaft or body 12 upwards the cone-shaped portion 16 expands the gripping members into biting engagement with the pipe, during this action the collar 35 has been forced away from collar 20 by the spring 42, placing the elements substantially in the position shown in Fig. 2, and since the stem 38 has moved entirely beneath the locking plate said plate has been swung inward against the shanks 14 thereby releasing the pin 33 from the holding lug 27 and permitting said pin to move forward in slot 28, into the position shown in Fig. 5, the locking plate being then in the position shown in dotted outline in Fig. 5. When it is desired to remove the gripping device from the pipe, as when the pipe is stuck and impossible to remove with the device, or for any reason, it is only necessary to thrust the gripping device downward until the movable collar 35 engages the top of the pipe or any adjacent obstacle whereby the collar and its attached stem 38 are moved upward against the tension of spring 42, the stem moving the bearing finger 26 of the locking plate and the point of the plunger rearward by means of the beveled portions on said stem and plunger, whereupon the point of the plunger engages under the locking lip 40 on stem 38, as best seen in Fig. 8, whereby the gripping elements are locked in release position and the device may be withdrawn from the pipe.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A pipe gripping device comprising a body with a member fixed thereon, means movably mounted on said body and having a member movable with respect to said fixed member, pipe gripping means fastened to said movable member, locking means movable on said fixed member and arranged to move into engagement with said movable member and hold the gripping means in release position, and spring actuated means mounted in said fixed member for automatically releasing said locking means from said movable member.

2. A pipe gripping device comprising a body and gripping means mounted thereon, means for locking said gripping means in release position, means for automatically releasing said locking means while said device is moved into pipe engaging position, and means on said body for automatically forcing said members to grip the pipe.

3. A pipe gripping device comprising a body and gripping means mounted thereon, means for locking said gripping means in contracted release position, means for automatically releasing said gripping means from said locked position to render it effective, and automatic means for holding said gripping means in release position for removal from said pipe.

4. A pipe gripping device comprising a body and gripping members mounted thereon, means for locking said gripping members in release position, means for automatically releasing said locking means by the movement of said body, means for automatically moving and holding said members in pipe gripping position, and means actuated automatically by a thrust of said device for locking said members in release position.

5. A pipe gripping device comprising a body and gripping members mounted thereon, means for locking said gripping members stationary in contracted release position, means on said body for moving said members in pipe gripping position, said gripping members being releasable by moving said body, and means actuated automatically by the movement of said body for again locking said gripping members in release position.

6. A pipe gripping device comprising a body having a spear with a restricted portion, means fixed to said body, means movably mounted on said body near said fixed means, gripping means seated on said restricted portion and fastened to the movable means for movement therewith, a member on said movable means for engaging said fixed means, and means on said fixed means to engage said member and lock said gripping means in contracted release position on said restricted portion for insertion in a pipe.

7. A pipe gripping device comprising a body, means fixed to said body, means movably mounted on said body beneath said fixed means, gripping means fastened to the movable means and movable therewith along said body, a member on said movable means for engaging in said fixed means, means in said fixed means to engage said member and positively retain said gripping means stationary in release position to insert in a well and to release said retaining means upon a forceful thrust of said device into a pipe.

8. A pipe gripping device comprising a body, means fixed to said body, means movably mounted on said body beneath said fixed means, gripping means fastened to said movable means to move therewith, a member on said movable means for engaging said fixed means, means on said fixed means to engage said member and retain the gripping means stationary in contracted release position ready for use, means on said retaining means for automatically releasing it by a thrust of said device into engagement with a pipe, and means on said retaining means and said member for locking said gripping means in release position for removal from said pipe.

9. A pipe gripping device comprising a body, means fixed to said body, means movably mounted on said body, gripping means fastened to the movable means, a member mounted on said movable means, means on said fixed means to engage said member and retain said gripping means in release portion, means on said retaining means to release it by moving said body in said movable means, means on the lower part of said body for forcing said gripping means into pipe gripping position, and means on said retaining means for engaging a lip on said member to lock said gripping means in release position.

10. A pipe gripping device comprising a body with a member fixed thereon, means movably mounted on said body and having a member movable with respect to said fixed member, pipe gripping means fastened to said movable member, a locking plate on said fixed member arranged to engage said movable member and retain the gripping means in release position, and means mounted in said fixed member and provided with a pin for operating said locking plate.

11. A pipe gripping device comprising a body with a collar fixed thereon, means movably mounted on said body and having an element movable in said fixed collar, pipe gripping means fastened to said movable means, a locking member on said fixed collar for locking said element and gripping means in release position, and movable means on said fixed collar engaging said locking member and automatically releasing it from said element while said movable means is forced into engagement with a pipe.

12. A pipe gripping device comprising a body with a member fixed thereon, means movably mounted on said body and having an element movable in said fixed member, pipe gripping means fastened to said movable member, a locking member on said fixed member for locking said element and gripping means in release position, spring pressed means in said fixed member having a pin to engage and release said locking member automatically upon movement of said movable means, and a lip on said spring pressed means to automatically engage a lip on said element upon a second movement of said movable means.

13. A pipe gripping device comprising a body having means supporting a swingable plate, a collar slidably mounted on said body and provided with a fixed stem engageable by said plate, pipe gripping means fastened to said collar, movable means mounted on said supporting means and manually operable for swinging said plate into engagement with said stem, a spring for urging said collar from said supporting means and for retaining said plate and stem in engagement, and a spring on said movable means to swing said plate out of engagement with said stem upon an upward movement of said collar.

14. A pipe gripping device comprising a round shaft provided with peripheral grooves and a conical lower portion, curved pipe gripping members mounted on said conical portion and having tangs slidable in said grooves, a member fixed to said tangs and slidable therewith on said shaft, and means for retaining said gripping members in release position.

15. A pipe gripping device comprising a round shaft provided with a peripheral groove and a conical lower portion, a cylindrically curved pipe gripping member mounted on said conical portion and having a tang slidable in said groove, a member connected to said tang and slidable therewith on said shaft, means on said shaft for retaining said gripping member in release position, and means for releasing said retaining means by a movement of said slidable member on said shaft and for locking said gripping member in release position by a second movement of said slidable member on said shaft.

In testimony whereof I have signed my name to this specification in the presence of two subscribing witnesses.

PETER G. LEONARD.

Witnesses:
G. R. CONNER,
J. E. SWANNER.